Feb. 5, 1963  D. D. FULLER ETAL  3,076,523
BEARINGS

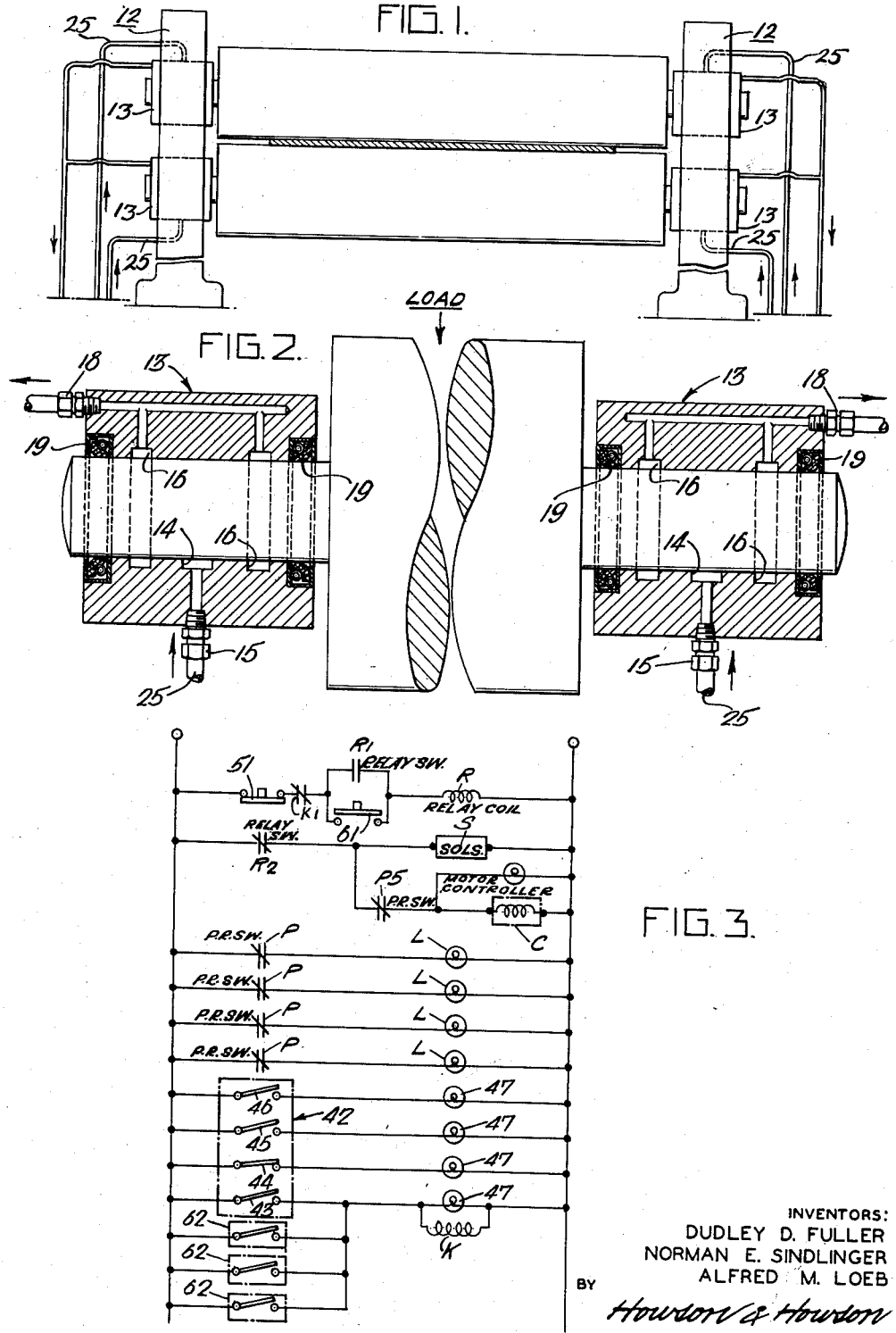

Filed Sept. 8, 1959  2 Sheets-Sheet 2

INVENTORS:
DUDLEY D. FULLER
NORMAN E. SINDLINGER
ALFRED M. LOEB

BY Howson & Howson
ATTYS.

3,076,523
BEARINGS
Dudley D. Fuller, Yonkers, N.Y., and Alfred M. Loeb, Trevose, and Norman E. Sindlinger, Meadville, Pa., assignors to Eastern Rolling Mills, Inc., New York, N.Y., a corporation of New York
Filed Sept. 8, 1959, Ser. No. 838,466
5 Claims. (Cl. 184—7)

The present invention relates to bearings, and more particularly to improved controls for hydrostatic bearings in which a controlled volume of pressurized lubricant supplied from an external source is caused to flow through the bearing to provide a fluid film separating the moving parts of the bearing and supporting the load thereof.

In bearings of this type it is often desirable to employ high viscosity lubricants since the power required to operate the bearing at a given film thickness decreases as the viscosity increases. Furthermore, the load which a bearing can carry at a given film thickness and input power increases in direct proportion to the square root of the viscosity, and for a given load and pumping power the film thickness increases as the cube root of the viscosity. The use of high viscosity lubricants, on the other hand, presents certain problems in the controls for the lubricant since such lubricants require special pumps, valves, and other components which may not operate as economically or as flexibly as components suitable for use with low viscosity fluids.

The present invention provides a control for hydrostatic bearings in which the control elements or components embody a relatively low viscosity hydraulic fluid and are connected to the bearing by means of a hydraulic transformer which provides a high viscosity lubricant in the bearing per se.

The present invention also provides a control circuit including means to replenish the supply of high viscosity lubricant.

More specifically, the present invention provides a control for hydrostatic bearings including a lubricant system and a flow control valve in an associated hydraulic system having a hydraulic fluid operating on hydraulic transformers to insure a controlled flow of lubricant through the bearings, said lubricant having different characteristics than the hydraulic fluid.

All of the objects of the invention and the various features and details of the construction and operation thereof are more fully set forth hereinafter with reference to the accompanying drawing wherein:

FIG. 1 is a view of a roll stand embodying hydrostatic bearings controlled in accordance with the present invention;

FIG. 2 is an enlarged view partially in section showing the construction of the bearings;

FIG. 3 is a schematic diagram of the electrical circuit for controlling the supply of fluid for the bearings, the parts being shown in the current-off position.

Figure 4:
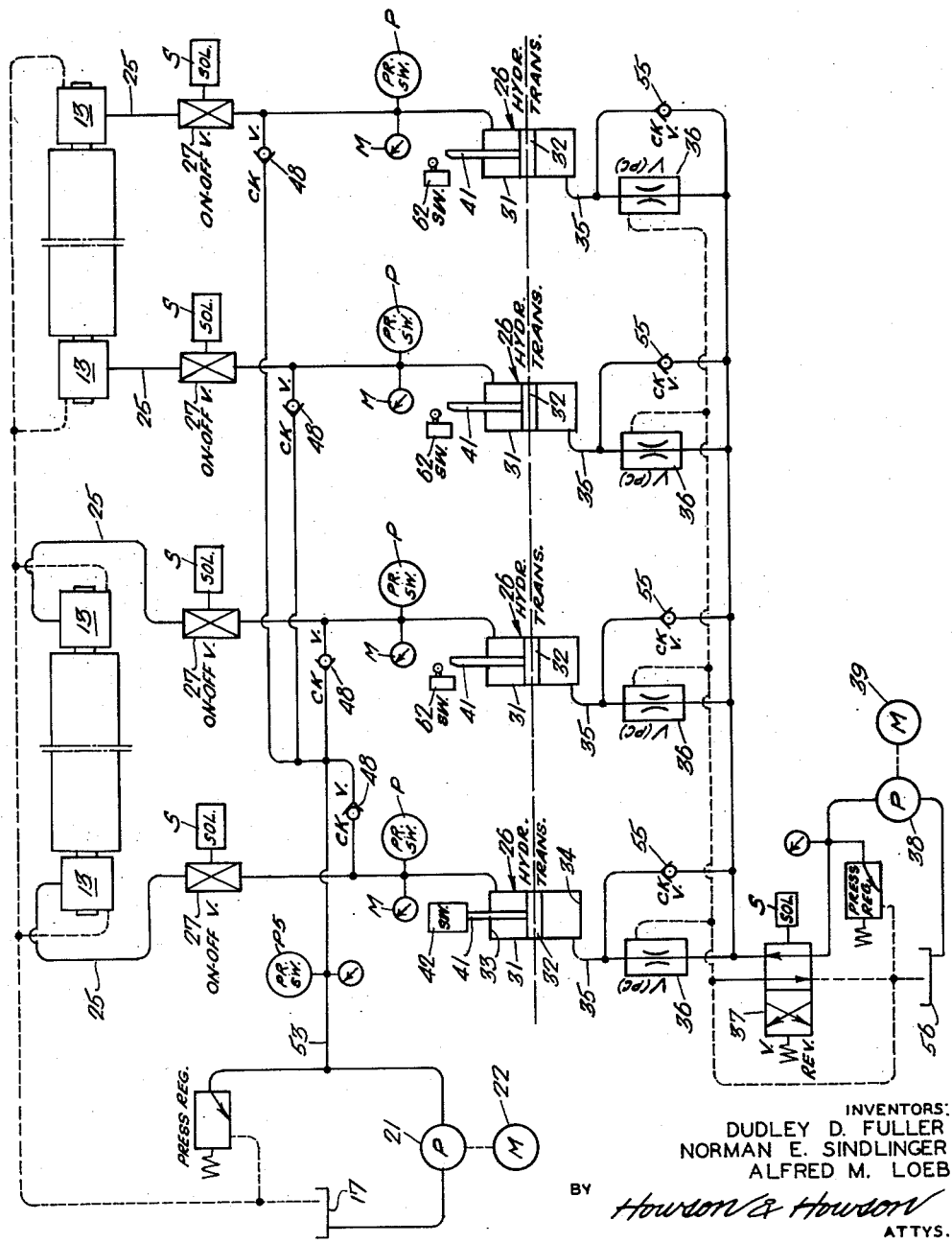
FIG. 4 is a schematic diagram of the hydraulic circuit.

Referring to the drawings, the invention is shown applied to a roll stand 12 embodying a plurality of hydrostatic bearings 13. Each bearing 13 comprises a high pressure recess 14 into which a predetermined volume of lubricant is continuously supplied through a fitting 15. Of course each bearing may, if desired, be provided with a plurality of high pressure recesses. The lubricant supplied through the fitting 15 is caused to flow out through the bearing into a pair of drain grooves 16 which collect the lubricant and return it to a reservoir shown diagrammatically at 17 in FIG. 4, through a fitting 18. The bearing is a complete bearing and is sealed as indicated at 19 so that the entire flow of lubricant is into the reservoir 17. From the reservoir 17, the lubricant is returned to the system during the recharging cycle by means of a lubricant feed pump 21 driven by an electric motor 22 (see FIG. 4).

In accordance with the invention, the lubricant is fed to the fittings 15 of the bearings by a supply line 25 connected to a hydraulic transformer or fluid-actuated pump 26 through a solenoid actuated valve 27. In the present instance, the hydraulic transformer 26 comprises a cylinder 31 having a piston 32 therein forming at one end a chamber 33 for the lubricant and at the other end a chamber 34 for the control hydraulic power fluid. The chambers are constructed so that expansion of one chamber effects a corresponding collapse or contraction of the other. The hydraulic power fluid is supplied to the chamber 34 through a line 35 having a flow control valve 36, in the present instance a pressure-compensated valve operable to provide constant flow, a solenoid actuated valve 37, and a pump 38 driven by an electric motor 39. The valve 36 effects a controlled flow of hydraulic fluid into the chamber 34 to cause the piston 32 to move to reduce the size of the chamber 33 and discharge lubricants through the line 25 into the recess 14 of the bearing. Since the hydraulic fluid may be of low viscosity relative to the highly viscous lubricant, control of the hydraulic fluid by the valve 36 is relatively simple and economical. Because of differential area effect of the piston rod 41 within the chamber 33 the transformer 26 steps up the pressure transferred from the hydraulic power side to the lubricant pump side of the transformer. Thus, the hydraulic transformer 26 insures effective operation of the hydrostatic bearing 13.

Means is provided to charge the lubricant chambers 33 of the several hydraulic transformers 26 when the supply of lubricant therein is depleted. To this end, the piston 32 has a piston rod 41 which cooperates with a position-indicating switch 42, which, in the first transformer has four contacts 43, 44, 45 and 46 (see FIG. 3) which are closed respectively when the piston is at its upper limit position, an upper intermediate position, a lower intermediate position, and a lower limit position. The contacts as shown in FIG. 3 are connected to indicator lights, indicated collectively at 47 which show the relative position of the piston and indicate the condition of the lubricant supply in the chamber 33.

Bearing in mind that when current is applied to the circuit the relay-operated switch contacts R1, R2 are in positions opposite to the FIG. 3, positions, the recharging operation is as follows: When the supply of lubricant in the chamber 33 is low, it is necessary to recharge the system, and to this end, the solenoid valves 27 are closed, the solenoid valve 37 is opened to sump, and the motor 22 is started, for example by a controller C to start the pump 21 causing flow of lubricant from the reservoir 17 into the lines 25 through check valves 48. This is accomplished by pressing the recharge button 51 which deenergizes the relay R opening the holding contact R1 of the relay R and closing the solenoid valve contact R2 of the relay R which energizes the several solenoids S controlling the solenoid valves 27 and 37. Simultaneously with the energization of the solenoids S, a circuit is completed through a normally closed pressure-responsive switch P5 (opens at high recharge pressure as will be explained below) to the controller C for the motor 22 to initiate operation of the motor and therefore the pump 21. The switch P5 is positioned in the discharge line 53 from the pump 21 and is normally closed, so that the pump 21 continues to operate until the pressure in the line 53 exceeds a pre-determined value. The pressure in the line 53 overcomes the back pressure of the check valves 48 and causes the lubricant to flow into the several chambers 33, thereby driving the pistons 32 downwardly and discharging the hydraulic fluid from the chamber 34 through a check valve 55 bypassing the flow control valve 36 and into a sump 56 by way of the energized solenoid valve 37.

When the pistons 32 reach their lower limit position, the pressure builds up in the line 53 to operate the pressure-responsive switch P5 to open position, thereby disconnecting the controller C and stopping the motor 22 and the pump 21. The reset button 61 is then pressed to re-energize the relay R, thereby closing the holding contact R1 and opening the contact R2, deenergizing the solenoid S. This resets the valves 27 to open position and the valves 37 to the illustrated position to render the system operative to provide the necessary flow of lubricant through the bearings 13. In the circuit illustrated in the drawings, only one of the transformers 36 is provided with a four-position indicator switch 42, the remaining transformers being provided with a single position indicator switch 62 which is closed when the lubricant chamber 33 is empty. Each switch 62 is connected in parallel with the contact 43 of the switch 42 to operate the signal light indicating that the supply of lubricant is depleted. Of course, separate signal lights may be employed for each cylinder, if such is desired.

It is understood that instead of relying on the signal lights 47 to determine the necessity for recharging the lubricant system, the circuits may be arranged to automatically re-charge the circuit when the lubricant supply becomes depleted. This may be done by placing a relay (coil) K in parallel with the signal light 47 of FIG. 3, which when energized, opens the normally-closed switch contact K1 which functions like the recharge pushbutton 51 to initiate recharging.

In order to insure proper pressure of the lubricant in each bearing, each line 25 is provided with a pressure-responsive switch P which is operated to closed position to energize the lamp L indicating a failure of pressure in the associated line. In addition, a pressure meter M is provided in each line to indicate the pressure of the lubricant therein.

While the invention has been described with particular reference to a hydraulic cylinder type of transformer, and with reference to a particular bearing construction, it is apparent that other hydraulic transformers and other hydrostatic bearings may be substituted for those illustrated in the drawing. Likewise, a pressure-compensated flow control valve providing a constant flow has been illustrated and described, but other flow control components may be employed without departure from the present invention. Other modifications may be made within the scope of the invention as defined by the appended claims.

We claim:

1. Apparatus for supplying high-viscosity lubricant to a plurality of bearings each having a lubricant recess therein, comprising in combination, a lubricant supply conduit connected to each bearing recess for supplying high viscosity lubricant thereto, means to collect the lubricant flowing from said bearing recesses, a collapsible lubricant supply chamber connected to each of said supply conduits, an expansible hydraulic fluid chamber arranged adjacent each lubricant supply chamber and provided with means operably associated with said lubricant chamber to collapse said lubricant chamber upon expansion of said hydraulic fluid chamber, a common low-viscosity hydraulic fluid supply means connected to all of said hydraulic fluid chambers for supplying pressurized hydraulic fluid thereto to expand them and thereby collapse said lubricant supply chambers, and a separate flow control valve arranged between said hydraulic fluid supply means and each of said hydraulic fluid chambers to control the rate of flow of hydraulic fluid and thereby control the rate of collapse of the associated high-viscosity lubricant chamber and the rate of flow of lubricant to the bearing recess connected to the lubricant chamber.

2. Apparatus for supplying high-viscosity lubricant to a plurality of bearings each having a lubricant recess therein, comprising in combination, a lubricant supply conduit connected to each bearing recess for supplying high-voscosity lubricant thereto, means to collect the lubricant flowing from said bearing recesses, a collapsible lubricant supply chamber connected to each of said supply conduits, an expansible hydraulic fluid chamber arranged adjacent each lubricant supply chamber and provided with means operably associated with said lubricant chamber to collapse said lubricant chamber upon expansion of said hydraulic fluid chamber, a common low-viscosity hydraulic fluid supply means connected to all of said hydraulic fluid chambers for supplying pressurized hydraulic fluid thereto to expand them and thereby collapse said lubricant supply chambers, a separate flow control valve arranged between said hydraulic fluid supply means and each of said hydraulic fluid chambers to control the rate of flow of hydraulic fluid and thereby control the rate of collapse of the associated high-viscosity lubricant chamber and the rate of flow of lubricant to the bearing recess connected to the lubricant chamber, lubricant supply means for introducing high-viscosity lubricant to said collapsible chamber when lubricant has been exhausted therefrom, and means actuated by the collapse of said lubricant chamber for starting said lubricant supply means into operation.

3. Apparatus for supplying high-viscosity lubricant to a plurality of bearings each having a lubricant recess therein, comprising in combination, a lubricant supply conduit connected to each bearing recess for supplying high-viscosity lubricant thereto, means to collect the lubricant flowing from said bearing recesses, a collapsible lubricant supply chamber connected to each of said supply conduits, an expansible hydraulic fluid chamber arranged adjacent each lubricant supply chamber and provided with means operably associated with said lubricant chamber to collapse said lubricant chamber upon expansion of said hydraulic fluid chamber, a common low-viscosity hydraulic fluid supply means connected to all of said hydraulic fluid chambers for supplying pressurized hydraulic fluid thereto to expand them and thereby collapse said lubricant supply chambers, a separate flow control valve arranged between said hydraulic fluid supply means and each of said hydraulic fluid chambers to control the rate of flow of hydraulic fluid and thereby control the rate of collapse of the associated high-viscosity lubricant chamber and the rate of flow of lubricant to the bearing recess connected to the lubricant chamber, each of said lubricant supply conduits including therein a first valve which in a first position provides a flow of lubricant from said collapsible lubricant chamber to a bearing recess and in a second position halts the flow of lubricant, a second valve disposed between said common hydraulic fluid supply means and said separate expansible hydraulic fluid chambers which in a first position provides a flow of hydraulic fluid to all of said expansible chambers and in a second position provides a flow of hydraulic fluid out of all of said expansible chambers, lubricant supply means connected to said lubricant supply conduit between said first valve and said collapsible lubricant supply chamber, and electrical circuit means to simultaneously operate said first valves to said second position and said second valve to said second position to thereby cause lubricant to be supplied from said lubricant supply means into said collapsible lubricant supply chambers with accompanying discharge of hydraulic fluid from said hydraulic fluid chambers.

4. Apparatus for supplying high-viscosity lubricant to a plurality of bearings each having a lubricant recess therein, comprising in combination, a lubricant supply conduit connected to each bearing recess for supplying high-viscosity lubricant thereto, means to collect the lubricant flowing from said bearing recesses, a collapsible lubricant supply chamber connected to each of said supply conduits, an expansible hydraulic fluid chamber arranged adjacent each lubricant supply chamber and provided with means operably associated with said lubricant chamber to collapse said lubricant chamber upon expansion of said hydraulic fluid chamber, a common low-viscosity hydraulic fluid supply means connected to all of said hydraulic fluid chambers for supplying pressurized hydraulic fluid thereto to expand them and thereby collapse said lubricant supply chambers, a separate flow control valve arranged between said hydraulic fluid supply means and each of said hydraulic fluid chambers to control the rate of flow of hydraulic fluid and thereby control the rate of collapse of the associated high-viscosity lubricant chamber and the rate of flow of lubricant to the bearing recess connected to the lubricant chamber, each of said lubricant supply conduits including therein a first valve which in a first position provides a flow of lubricant from said collapsible lubricant chamber to a bearing recess and in a second position halts the flow of lubricant, a second valve disposed between said common hydraulic fluid supply means and said separate expansible hydraulic fluid chambers which in a first position provides a flow of hydraulic fluid to all of said expansible chambers and in a second position provides a flow of hydraulic fluid out of all of said expansible chambers, lubricant supply means connected to lubricant supply conduit between said first valve and said collapsible lubricant supply chamber, and electrical circuit means to simultaneously operate said first valves to said second position and said second valve to said second position to thereby cause lubricant to be supplied from said lubricant supply means into said collapsible lubricant supply chambers with accompanying discharge of hydraulic fluid from said hydraulic fluid chambers, said lubricant supply means including a motor-driven pump, a separate pump supply line to each of said lubricant supply conduits, a check valve in each of said pump supply lines opening from the pump toward said lubricant supply conduits, and means for operating said pump simultaneously with the moving of said first valves to their second position in said lubricant supply conduits.

5. Apparatus for supplying high-viscosity lubricant to a plurality of bearings each having a lubricant recess therein, comprising in combination, a lubricant supply conduit connected to each bearing recess for supplying high-viscosity lubricant thereto, a first valve in each of said lubricant supply conduits movable between closed and opened positions, means to collect lubricant flowing from said bearing recesses, a collapsible lubricant supply chamber connected to each said lubricant supply conduit to continuously supply lubricant under pressure thereto, an expansible hydraulic power fluid chamber located adjacent each collapsible lubricant chamber and having means operatively associated therewith to continuously reduce the size of said lubricant supply chamber as the size of said hydraulic power fluid chamber expands, a common low-viscosity hydraulic power fluid supply means, including a power fluid supply line and source, for supplying hydraulic power fluid continuously to all of said expansible hydraulic power fluid chambers, a second valve in said hydraulic power fluid supply line which in a first position is open from said source to said expansible hydraulic fluid chamber and in a second position is open from said expansible hydraulic fluid chamber to a sump, a flow control valve between said second valve and said expansible hydraulic power fluid chamber, a check valve arranged in parallel with said flow control valve and opening away from said expansible hydraulic fluid chamber to said second valve, selectively operable means to inject high-viscosity lubricant into each of said lubricant supply conduits between said first valve and said collapsible lubricant supply chamber, electrical circuit control means for simultaneously closing said first valve and opening said second valve for the return of hydraulic fluid from said hydraulic power fluid chamber and also to cause said selectively operable lubricant injection means to operate to thereby supply lubricant to said lubricant supply chamber and force hydraulic power fluid out of said hydraulic power fluid chamber.

References Cited in the file of this patent

UNITED STATES PATENTS

| | | |
|---|---|---|
| 991,547 | Schad | May 9, 1911 |
| 1,696,737 | Scoville | Dec. 25, 1928 |
| 2,038,287 | Hawkes et al. | Apr. 21, 1936 |
| 2,688,382 | Georgeff | Sept. 7, 1954 |
| 2,908,898 | Mueller et al. | Oct. 13, 1959 |
| 2,938,756 | Loeb | May 31, 1960 |